US010878720B1

(12) United States Patent
Omidi

(10) Patent No.: US 10,878,720 B1
(45) Date of Patent: Dec. 29, 2020

(54) MULTI-LAYER TOY

(71) Applicant: Nader Omidi, Katy, TX (US)

(72) Inventor: Nader Omidi, Katy, TX (US)

( * ) Notice: Subject to any disclaimer, the term of this patent is extended or adjusted under 35 U.S.C. 154(b) by 0 days.

(21) Appl. No.: 16/732,345

(22) Filed: Jan. 1, 2020

Related U.S. Application Data

(60) Provisional application No. 62/858,286, filed on Jun. 6, 2019.

(51) Int. Cl.
*G09B 1/02* (2006.01)
*G09B 19/02* (2006.01)
*A63F 9/00* (2006.01)

(52) U.S. Cl.
CPC ............ *G09B 19/02* (2013.01); *A63F 9/0073* (2013.01); *A63F 9/0098* (2013.01); *G09B 1/02* (2013.01)

(58) Field of Classification Search
CPC ........................................................ G09B 1/02
USPC ......... 434/78, 172, 174, 198, 199, 404, 405; 446/147, 159, 151, 152, 149
See application file for complete search history.

(56) References Cited

U.S. PATENT DOCUMENTS 247,302 A * 9/1881 Candy .................... A63H 33/00 446/71
408,148 A * 7/1889 Throop ................. A63F 9/0078 273/153 R
2,728,167 A * 12/1955 Knott .................... A63F 9/0819 446/152
2,732,655 A * 1/1956 Dirckx .................. A63F 9/0819 446/152
2,755,577 A * 7/1956 Greensfelder ......... A63H 33/22 40/435
3,122,859 A * 3/1964 La Reaux, Jr. ........ G02B 27/06 446/152
3,717,942 A * 2/1973 Presby ..................... G09B 1/20 434/402
3,995,862 A * 12/1976 Bertin ................ A63F 3/00094 273/241
4,341,035 A * 7/1982 Jaworski ................ A63H 33/22 40/587
4,508,344 A * 4/1985 Krogh .................. A63F 3/0415 273/141 R
4,585,231 A * 4/1986 Batmanghlich ....... A63F 9/0613 273/155
4,634,385 A * 1/1987 Stemper .................. G09B 1/22 434/198
4,920,033 A * 4/1990 Cress ....................... G09B 1/22 235/78 M
4,973,253 A * 11/1990 Shook ..................... G01J 3/522 434/101
5,110,206 A * 5/1992 Mischke .............. A61B 5/1176 353/30
5,727,949 A * 3/1998 Bar-Or ................... G09B 23/28 40/491

(Continued)

*Primary Examiner* — Kurt Fernstrom
(74) *Attorney, Agent, or Firm* — Brett A. Schenck

(57) ABSTRACT

A multi-layer toy having at least one outer layer adjacent a planar layer or a ball where both the outer layer and the adjacent planar layer or ball each contain related information such that, in play, the information on the outer layer is made to align with the related information on the adjacent planar layer or ball. The information can comprise depictions of objects, things, characters, animals, or words, for a matching game, or the information can comprise numbers for a counting or mental math game. The toy is preferably sized to be hand-held.

12 Claims, 16 Drawing Sheets

(56) References Cited

U.S. PATENT DOCUMENTS

| | | | | |
|---|---|---|---|---|
| 6,272,776 | B1 * | 8/2001 | Santorsola | G09F 11/23 116/316 |
| 6,290,230 | B1 * | 9/2001 | Anthony | A63F 9/00 273/447 |
| 7,314,179 | B1 * | 1/2008 | Halbur | G07F 7/08 235/487 |
| 7,861,926 | B2 * | 1/2011 | Sheldon | G07F 7/086 235/380 |
| 8,459,999 | B2 * | 6/2013 | Washington | G09B 5/06 434/172 |
| 10,037,007 | B2 * | 7/2018 | Fender | G04B 45/0023 |
| 10,276,063 | B1 * | 4/2019 | Usi | G06C 1/00 |

* cited by examiner

MULTI-LAYER TOY

RELATED APPLICATION

The present application claims priority from U.S. Provisional Patent Application Ser. No. 62/858,286, filed Jun. 6, 2019.

FIELD OF THE INVENTION

The present invention is in the field of children's toys, and in particular relates to a three-dimensional, "hands on" activity toy that is intended to engage a child and encourage him or her to think.

BACKGROUND OF THE INVENTION

Children enjoy playing with bright and multi-colored toys and other pieces, and enjoy solving problems and discovering answers. Studies have shown that children remember more things they see than things they experience through their other senses. In current times, many such visual learning toys are two-dimensional on computers, electronic tablets, and cell phones. However, children can still benefit from experiences with three-dimensional toys, involving more senses than sight, and requiring active participation and thinking. The present invention provides such an experience.

SUMMARY OF THE INVENTION

Figure 1:
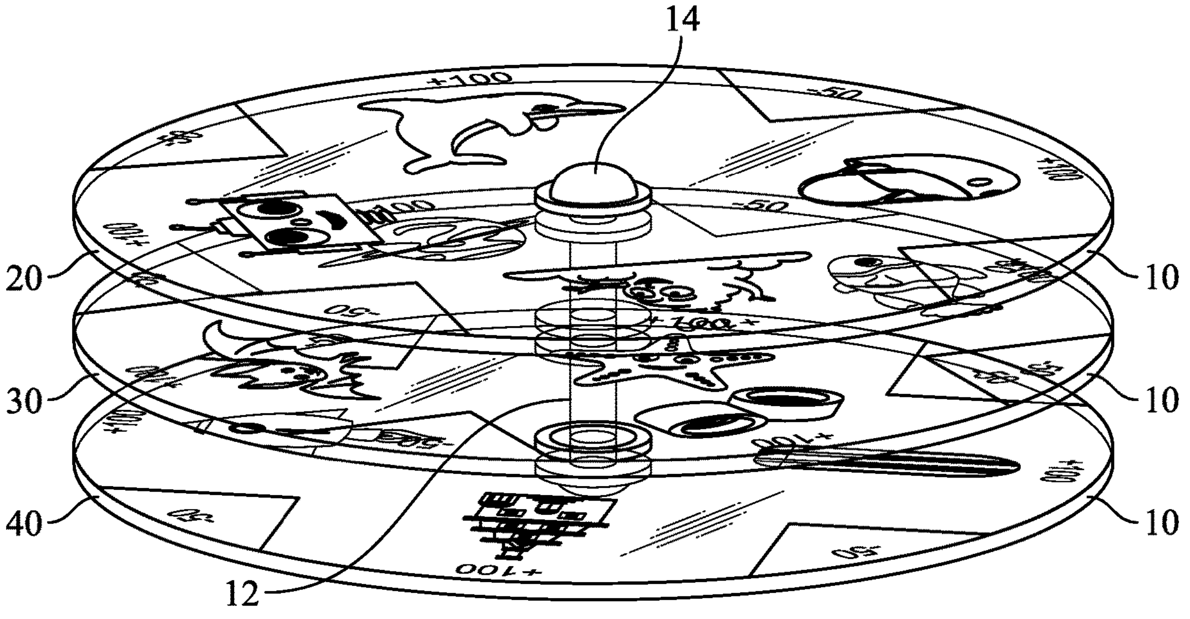
FIG. 1 is a perspective view of one embodiment of the invention having three independently rotatable layers.

The present invention provides a multi-layer toy having at least one outer layer adjacent a planar layer or a ball where both the outer layer and the adjacent planar layer or ball each contain related information such that, in play, the information on the outer layer is made to align with the related information on the adjacent planar layer or ball. The information can comprise depictions of objects, things or animals, for a matching game, or the information can comprise numbers for a counting or mental math game.

In one embodiment, the toy comprises about two to about five layers, which are each independently rotatable about a central axis holding the layers apart in adjacent parallel planes. These layers each have at least a portion which is transparent to enable viewing of at least a portion of the surface of the adjacent or underlying layer. In one embodiment, the layers are removably affixed to the central axis and are interchangeable. Information is included on each layer that is related to information on the other layers. The layers may be rotated about the axis and aligned for simultaneous viewing of the information on each layer that is related to information on the other layers.

In another embodiment, the toy comprises an opaque, planar layer mounted about a central axis. This opaque planar layer can be stationary and can have a first set of information on its top side and optionally a second set of information on its bottom on underneath side. In this embodiment, at least one upper layer, at least partially transparent, is rotatably mounted about the central axis above the top side of the opaque layer. This upper layer contains a third set of information thereon which is related to the first set of information. Optionally, this embodiment can further comprise at least one lower layer, at least partially transparent, rotatably mounted about the central axis beneath the bottom side of the opaque. This lower layer contains a fourth set of information thereon that is related to the second set of information on the bottom (or underneath)

side of the opaque. The upper layer may be rotated about the axis and aligned with the opaque for simultaneous viewing of at least a portion of the first set of information with the related portion of the third set of information or wherein the optional lower layer may be rotated about the axis and aligned with the opaque for simultaneous viewing of at least a portion of the second set of information with the related fourth set of information.

In still another embodiment, the toy of the invention comprises a a ball having a surface at least partially visible, and an outer layer at least partially covering or enclosing the surface of the ball. Such outer layer is independently rotatable about the ball and/or the ball can be rotatable independent of the outer layer. At least a portion of the outer layer is transparent to enable viewing of at least a portion of the surface of the ball. Information is provided on the outer layer that is related to information on the surface of the ball.

In some embodiments, the information on the various layers or surfaces of the toy of the invention is comprised of depictions of objects or things or animals, in whole or in part. Only one object or thing or animal on one layer relates to only one object or thing or animal in an adjacent layer or surface, for a matching game. In other embodiments, the information on the various layers or surfaces is comprised of numbers for a mental math or counting game.

DESCRIPTION OF PREFERRED EMBODIMENTS OF THE INVENTION

Referring to the Figures, an exemplary implementation of the child's activity toy of the present invention provides at least two and preferably about three generally clear or transparent layers or planar boards 10, positioned one above the other with a connection that enables each board 10 to independently rotate around the central connector 12 for the boards 10, as shown for example in FIG. 1. Such connection may be accomplished in various ways, such as, for non-limiting example, by snap rivets, brads, rollable magnets, nuts and bolts, pegs, ball bearings, or various combinations of these, as will be further discussed below. The boards 10 are preferably circular discs 16 as shown in the FIGS. 1-18, although they could alternatively be oval, oblong, square, triangular, star-shaped, or any number of different planar shapes. Alternatively, in another embodiment of the invention, the boards have non-planar shapes, such as for non-limiting example, spherical 10A, as shown in FIG. 19-22. The boards can all be the same shape per toy, as shown for example in FIG. 1, or can vary one from another in the same toy, as shown for non-limiting example in FIGS. 10, 12, and 13, where the middle layer or board has a different shape than the circular top and bottom layers or boards.

In some embodiments, such as shown for non-limiting example in FIGS. 1-9, the boards are preferably held to one another in a one-above-the-other configuration, using a snap rivet or snap-rivet type connector 14.

The boards 10 are made of hard, transparent plastic in one embodiment, as shown in FIGS. 1-9, 11, and 15-17. In another embodiment, the boards 10 are opaque, as shown for example in FIGS. 12 and 18, and the spherical body shown in FIGS. 19-22. Optionally, planar, opaque boards 10 can have holes or transparent viewing windows (not shown) for viewing the surfaces of adjacent boards. In still another embodiment, the boards 10 or cover 20 include one or more miniature magnifying glasses 15 for easier viewing of the surfaces on the boards 10 and 10A.

Figure 2:
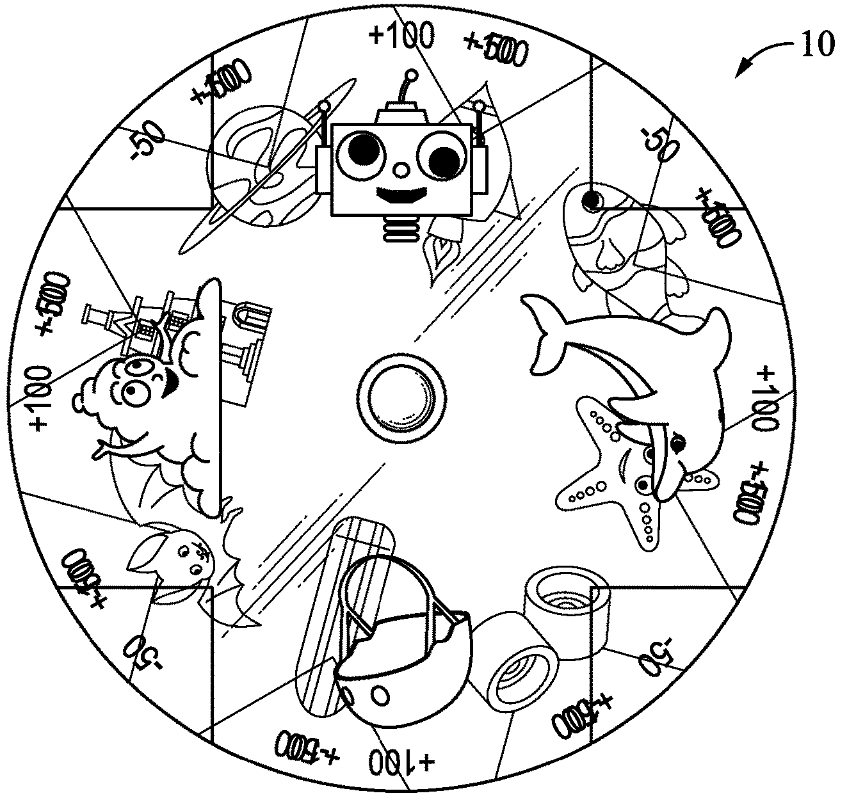
FIG. 2 is a top view of the embodiment of FIG. 1.
Figure 3:
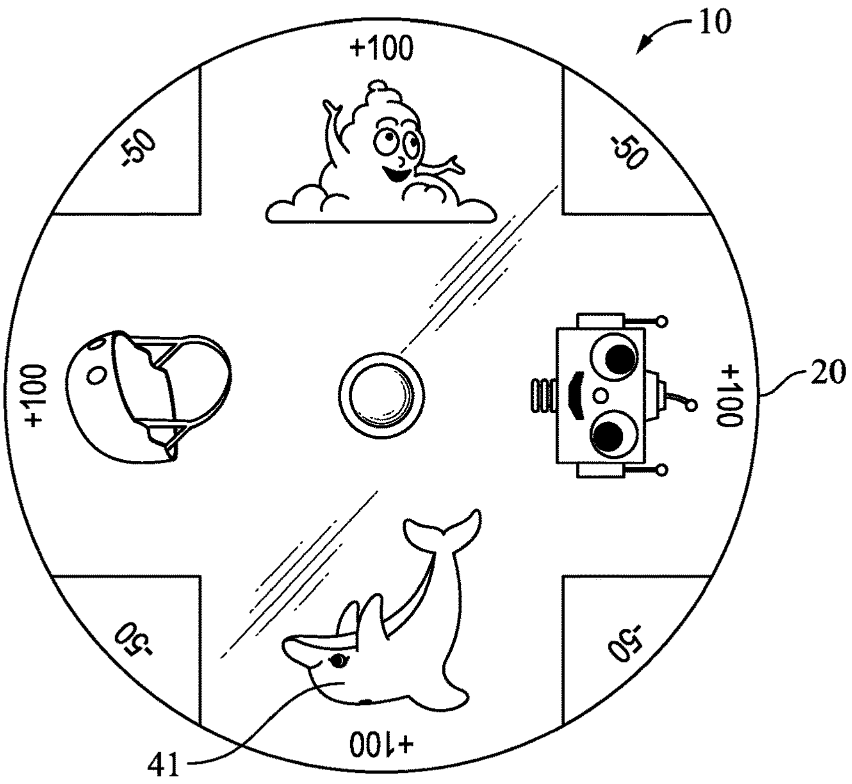
FIG. 3 is a top view of the top or first layer of the embodiment of FIG. 1.
Figure 4:
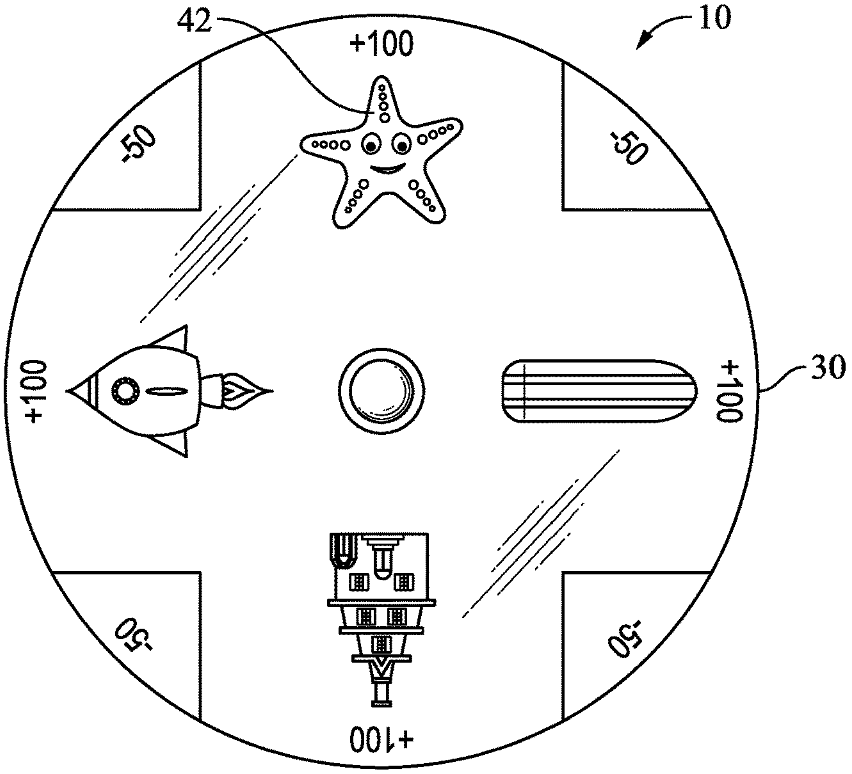
FIG. 4 is a top view of the middle or second layer of the embodiment of FIG. 1.
Figure 5:
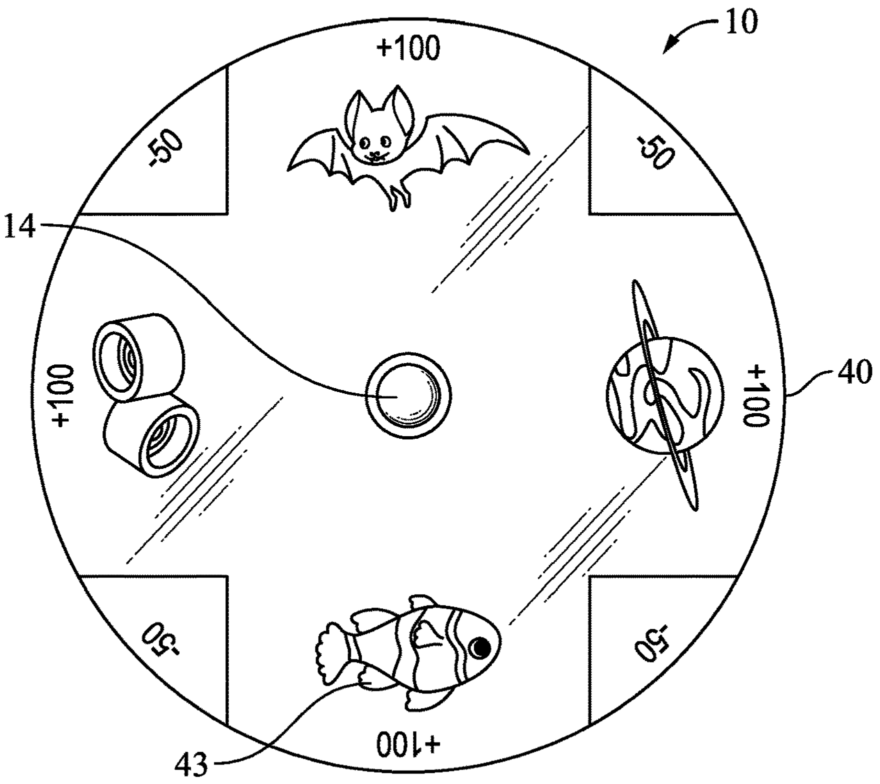
FIG. 5 is a top view of the bottom or third layer of the embodiment of FIG. 1.

On at least the "top" surface 11 of each of the boards 10, that is, the surface 11 that is facing or readily visible to the user of the invention, are various figures—depictions 16 of animals, characters, inanimate objects or shapes, or letters, words, or names; or numbers 25, for non-limiting example—that have a relationship to different or other figures—depictions 16 or numbers 25, (or letters, or words, or names, not shown)—on the other boards 10, as shown in FIGS. 1-18. For example, a first board might have a saddle, the second one a bridle, and the third one a horse; or for another example, a first board might have a cup, the second one a saucer, and the third one a teapot; or for still another example, a first board might have a dog, a second board might have a cat, and the third board might have a hamster (all pets). For another example, referring to FIGS. 1-5, a dolphin 41 on the first board or layer 20 (FIG. 3) lines up with a star 42 fish on the second board or layer 30 (FIG. 4), which lines up with a fish 43 on the third board or layer 40 (FIG. 5), all together one behind the other or matched as shown in FIG. 2, all showing sea creatures. That is, the figures—the depictions or numbers—on the boards 10 are matchable or related to the figures—the depictions or numbers—on the other boards. Each figure—depiction or number—on board 10 has a best match with or corresponds to a figure—depiction or number—on at least one other board. The best matching or corresponding figures on each board can line up so that they are under one another, or in-line (or aligned), on the boards.

Thus, when a toy of the invention is in use, a child chooses a figure—a depiction 16 or number 25—on a board 10 and turns the other boards 10 so that the "best match" on each of the other boards 10 is lined up above or below that first chosen figure. An advantage of the toy of this invention is that the game can be played alone or by two or more persons together. The game is preferably sized so as to fit in a child's hand for travel play, but larger versions are desirable for playing on a table or for installing on a wall or window. Thus, the actual size of the toy of the invention can typically range from about one inch in diameter to two to four feet in diameter (or more if practical for the space containing the invention). The larger sizes are particularly suited for classroom use.

Figure 6:
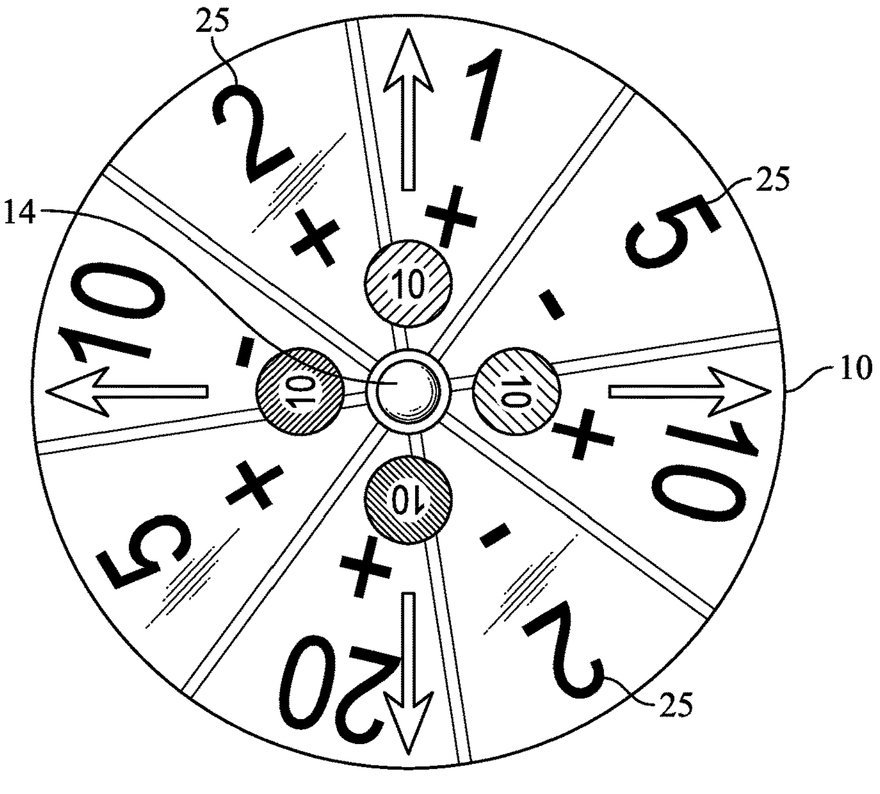
FIG. 6 is a top view of a first alternative embodiment showing depiction of numbers for use of the invention for mental math practice or a math game.
Figure 7:
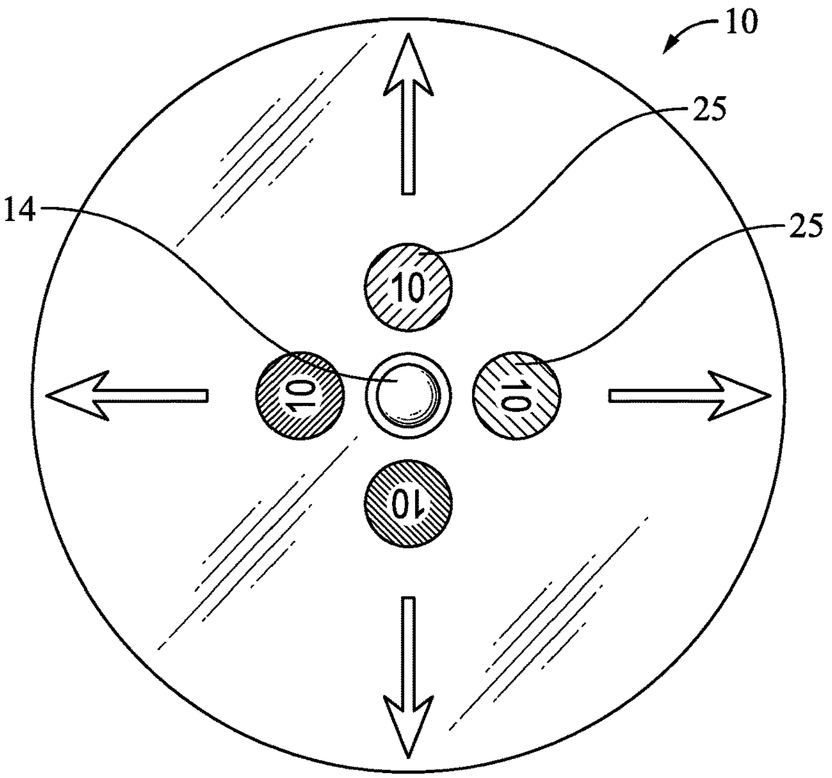
FIG. 7 is a top view of a top or first layer of the embodiment of FIG. 6.
Figure 8:
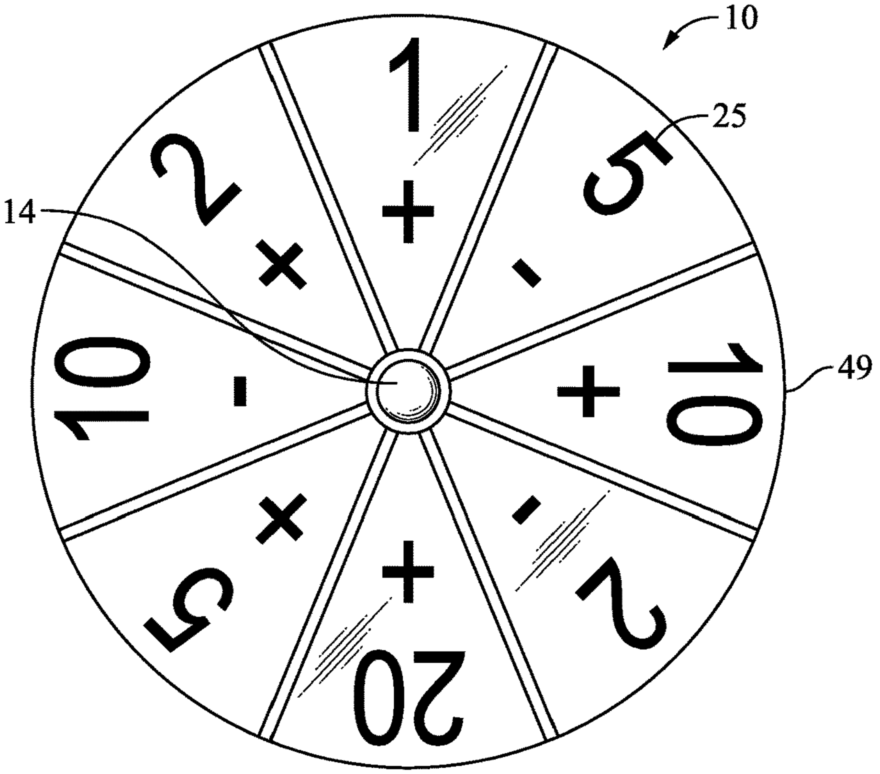
FIG. 8 is a top view of an underlying or second layer of the embodiment of FIG. 6.
Figure 9:
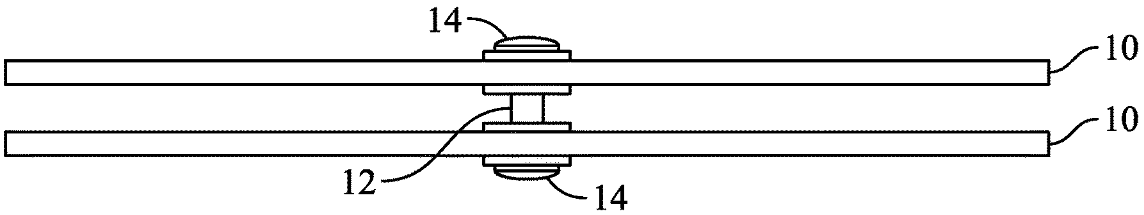
FIG. 9 is a side view of the embodiment of FIG. 6.
Figure 17:
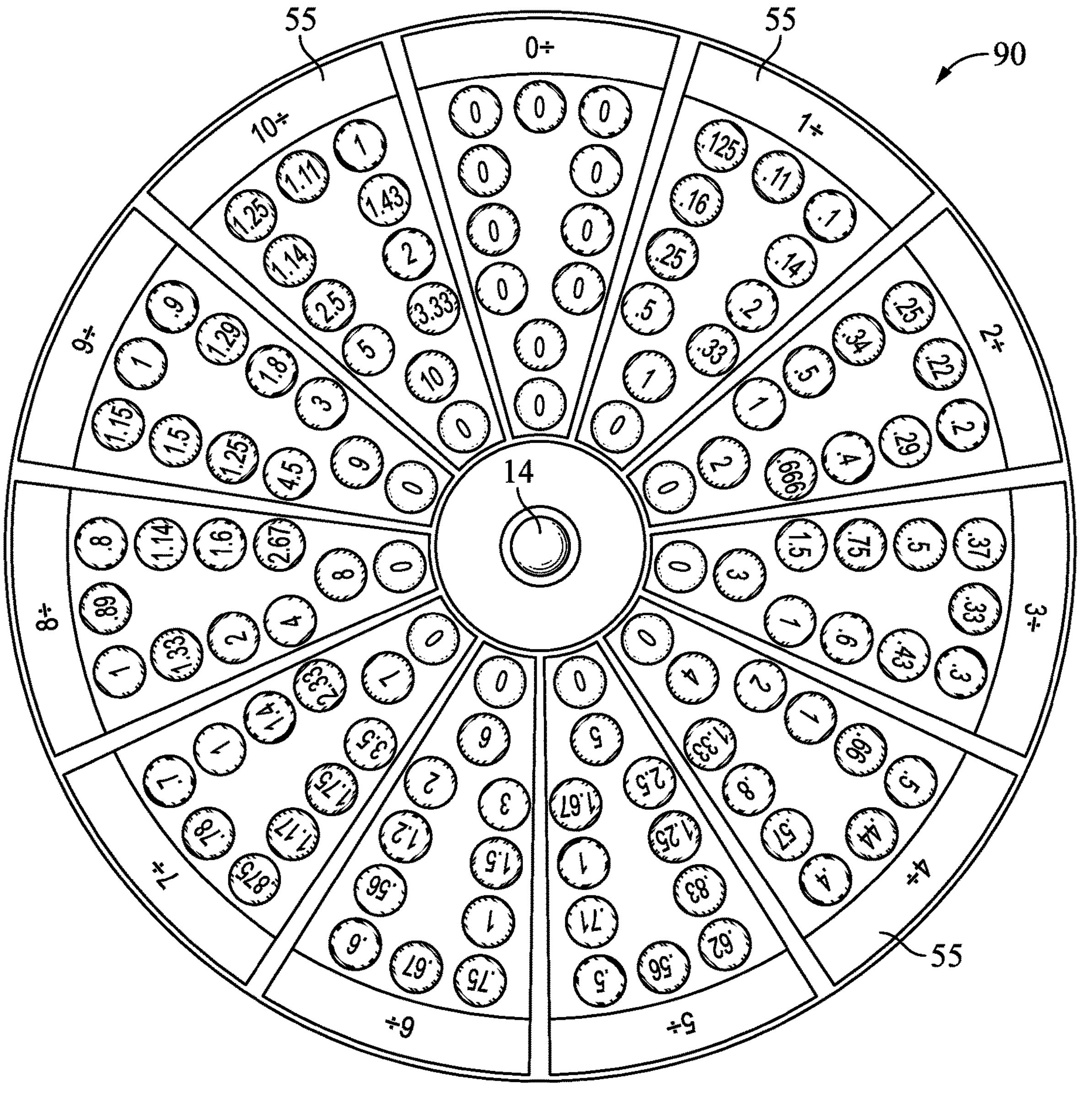
FIG. 17 is a fourth, alternative, top layer for the embodiment of FIG. 10, marked with numbers for division calculations.
Figure 18:
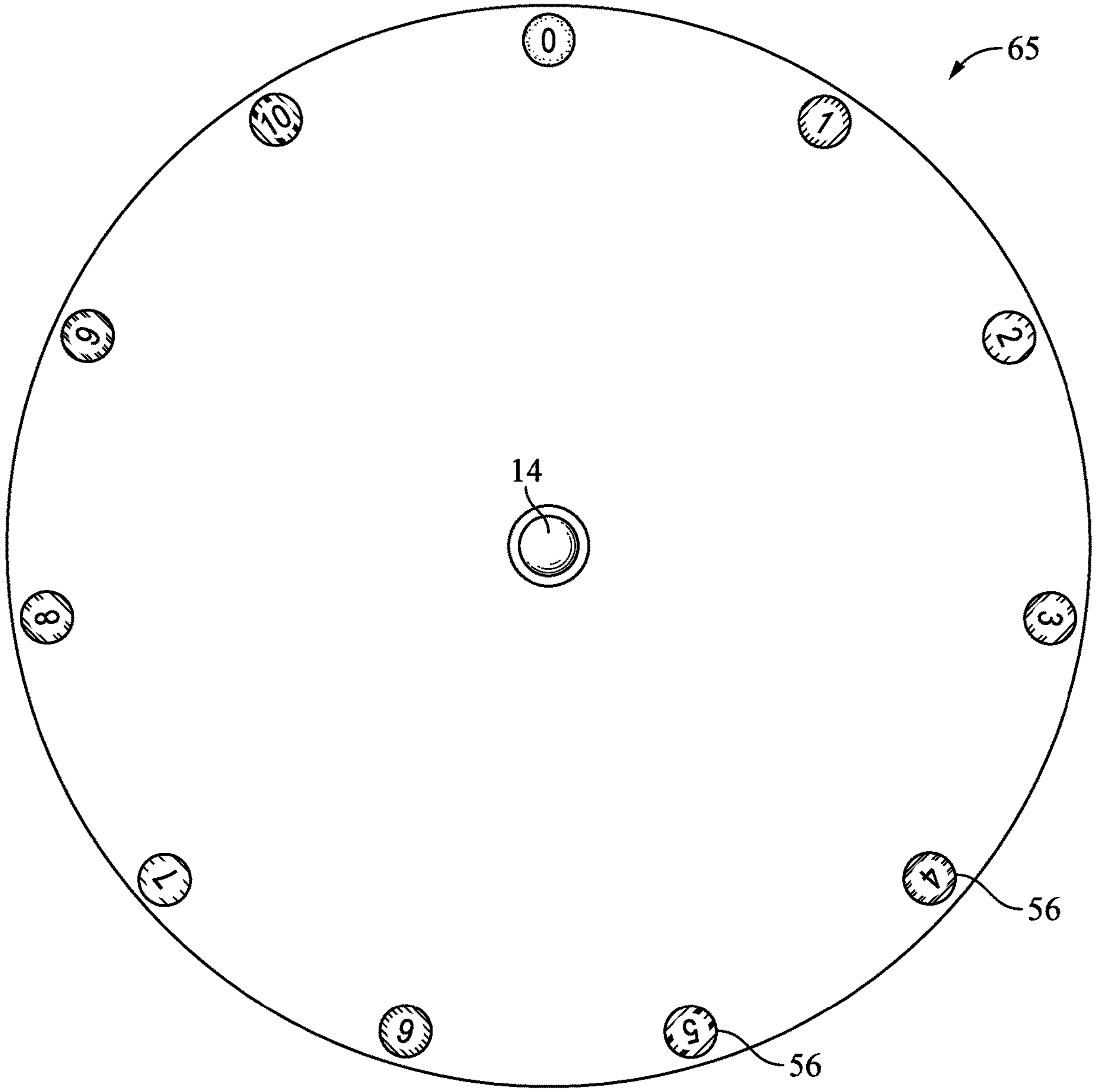
FIG. 18 is a top view of an alternative or underlying stationary layer that may be used with alternative top layers shown in FIG. 11, 15, 16, or 17, in a two-layer configuration as shown in FIG. 9, to comprise a third alternative embodiment of the invention, having two layers with number patterns for use of the invention for mental math practice or a math game.
Figure 19:
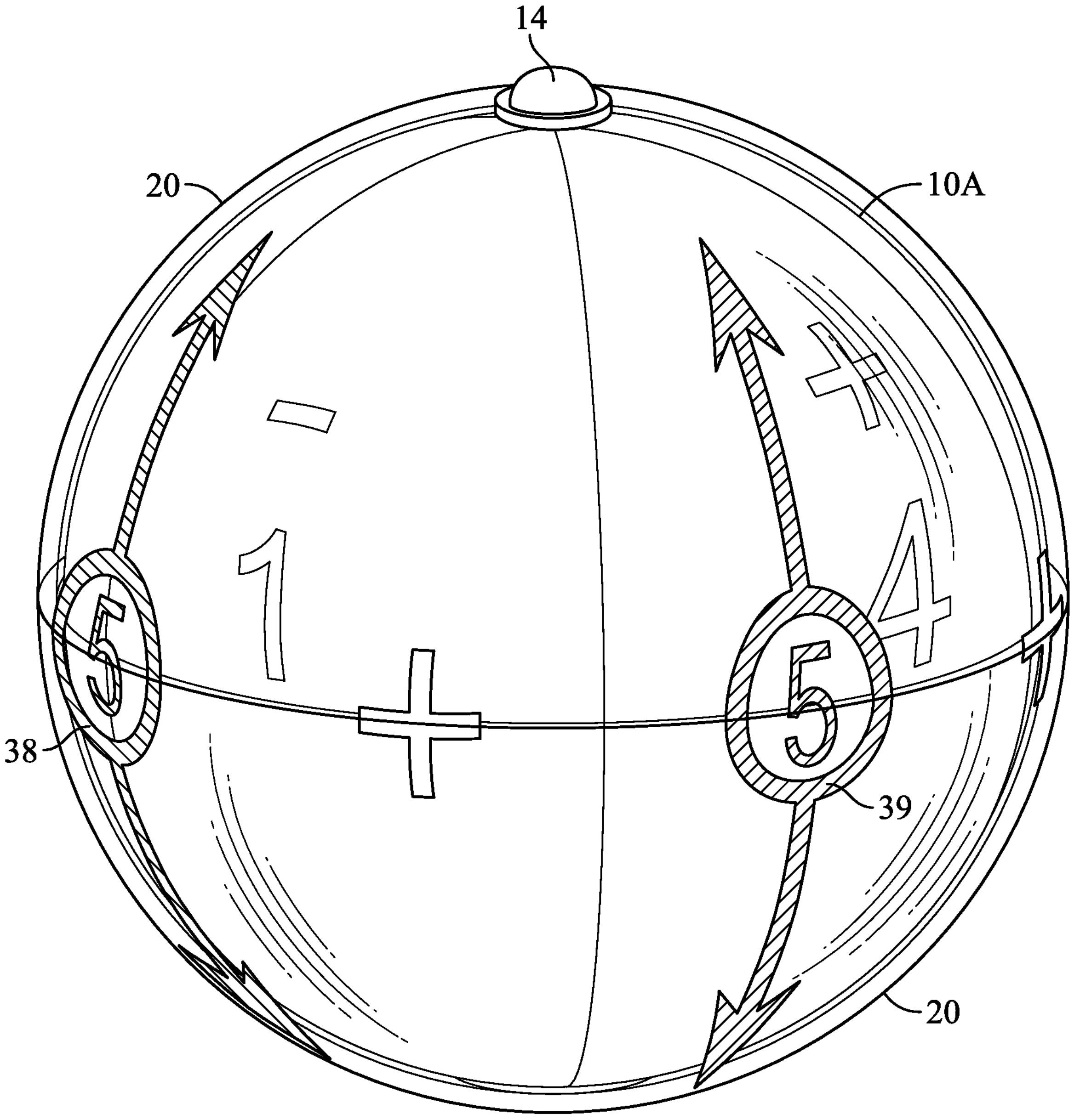
FIG. 19 is a side perspective view of a fourth alternative embodiment of the invention in the form of a ball with an outer covering rotatable about the ball, the ball rotatable within the covering, or both, depicted with numbers for mental math practice or a math game.
Figure 20:
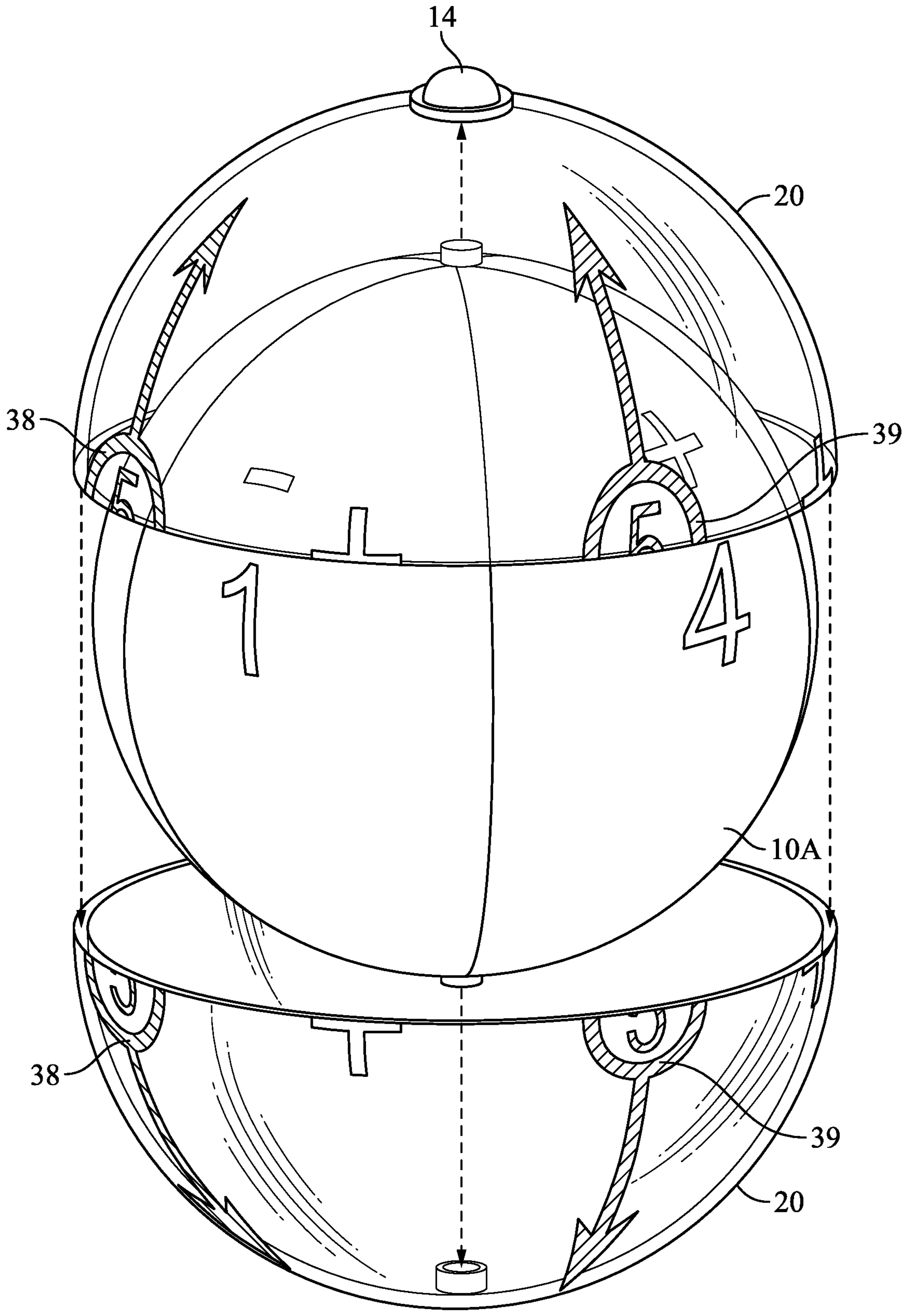
FIG. 20 is a blown apart view of the embodiment of FIG. 19.

Some alternative embodiments of the present invention to that shown in FIGS. 1-5 comprise all numbers 25, as shown for example in FIGS. 6-8, and for another example in FIGS. 10-14, and for another example in FIGS. 15-18, and for still another example in FIGS. 19-20, instead of depictions 16 on the boards 10 as shown in FIGS. 1-5. The numbers 25 on the embodiment of boards of FIGS. 6-8, are arranged for a mental math and competition game. In this embodiment of the invention, shown in FIGS. 6-8, a two layer board is provided that allows for multiple functions of math to be done as a game, or for practicing mental math. Depending on the turn of the board or wheel, one might add or subtract a number as provided in this example. The game could be played with one, two, three or four persons, each taking his or her turn and determining who gets the highest (or lowest) total value added or subtracted as provided by the wheel, preferably over multiple rounds.

In the embodiments of FIGS. 10-18, the numbers 25 are positioned such that the boards 10 can become in a sense a calculator. Specifically, referring to the FIGS. 10-18, one can see how the boards 10 can be used to add, subtract, multiple and divide—finding the answers by lining up numbers on the boards, as will be further described for example below.

Figure 10:
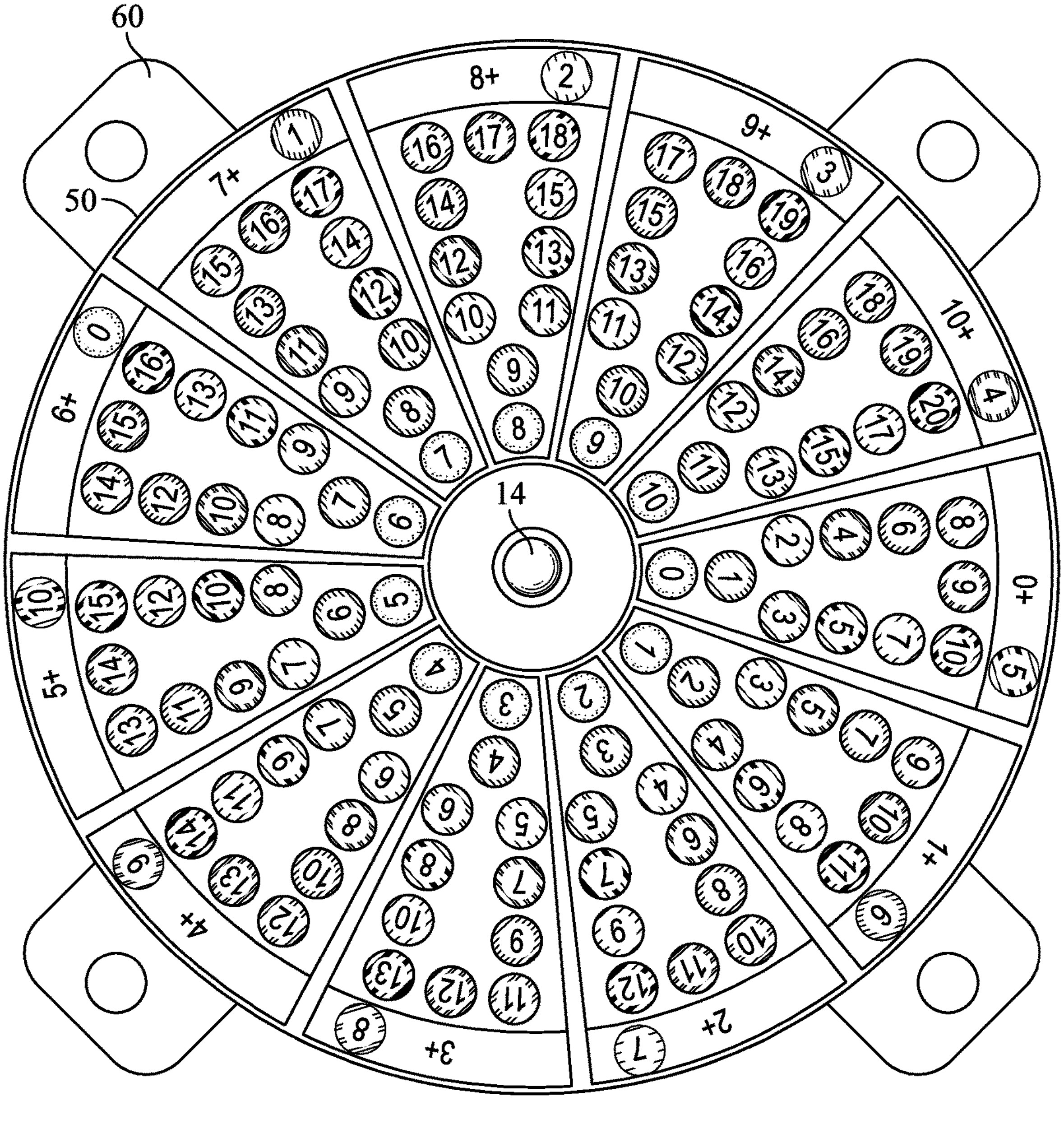
FIG. 10 is a top view of a second alternative embodiment of the invention having a stationary opaque middle layer, transparent top and bottom independently rotatable layers, the top layer marked with numbers for addition calculations and the bottom layer marked with numbers for subtraction calculations. The bottom layer is not seen in this FIG. 10 but is shown in FIGS. 13, 14, and 15.
Figure 11:
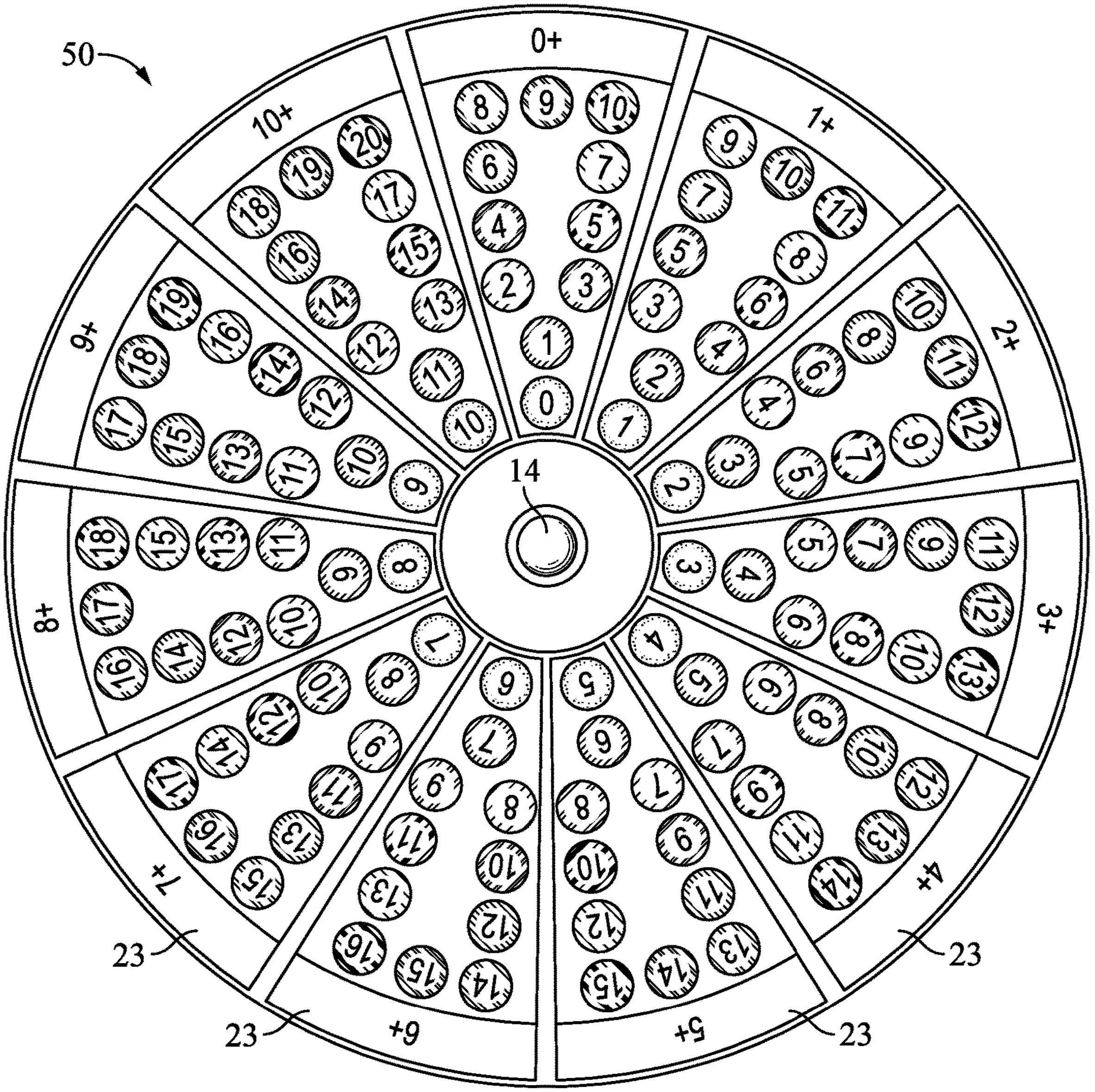
FIG. 11 is a top view of the top layer of the embodiment of FIG. 10.
Figure 12:
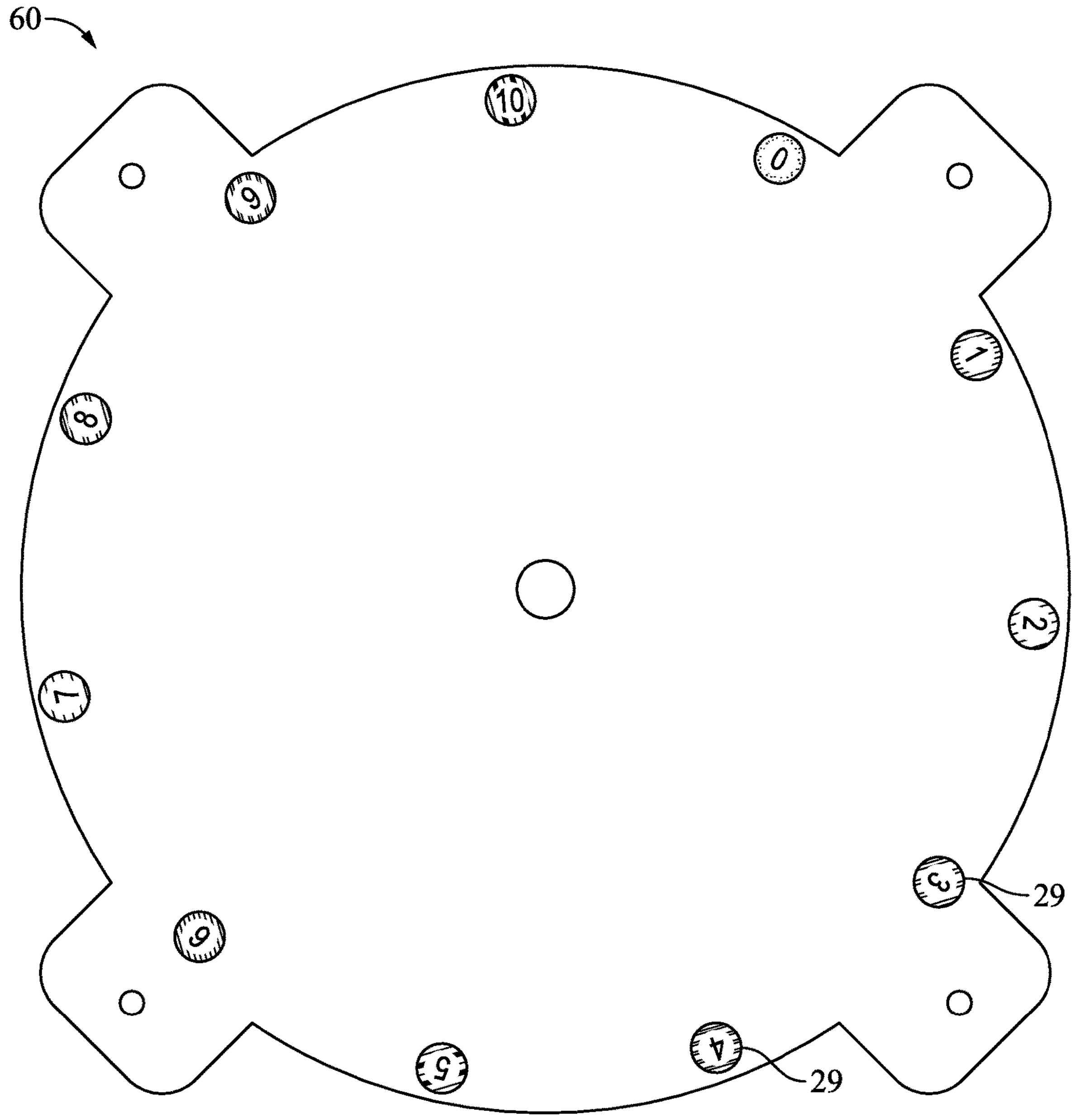
FIG. 12 is a view of the stationary middle layer of the embodiment of FIG. 10 apart from the top and bottom layer or with the top and bottom layers removed.
Figure 13:
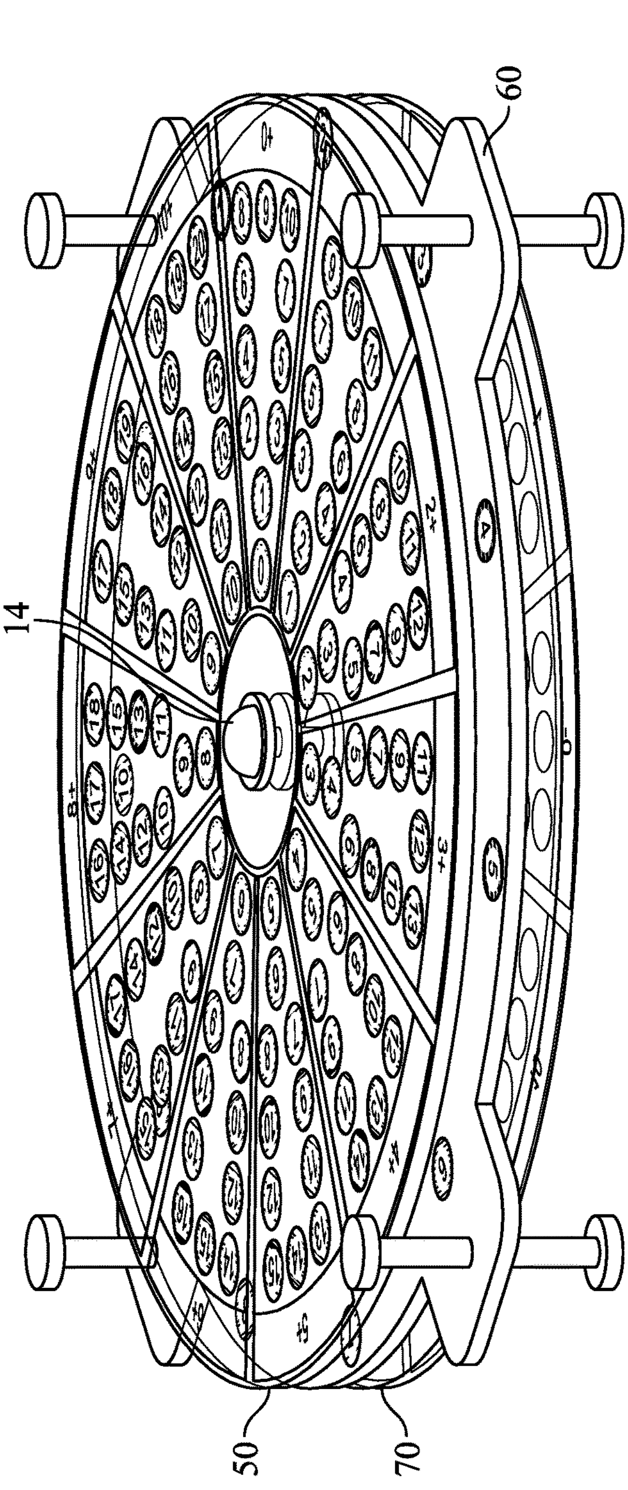
FIG. 13 is a perspective view of the embodiment of FIG. 10.
Figure 14:
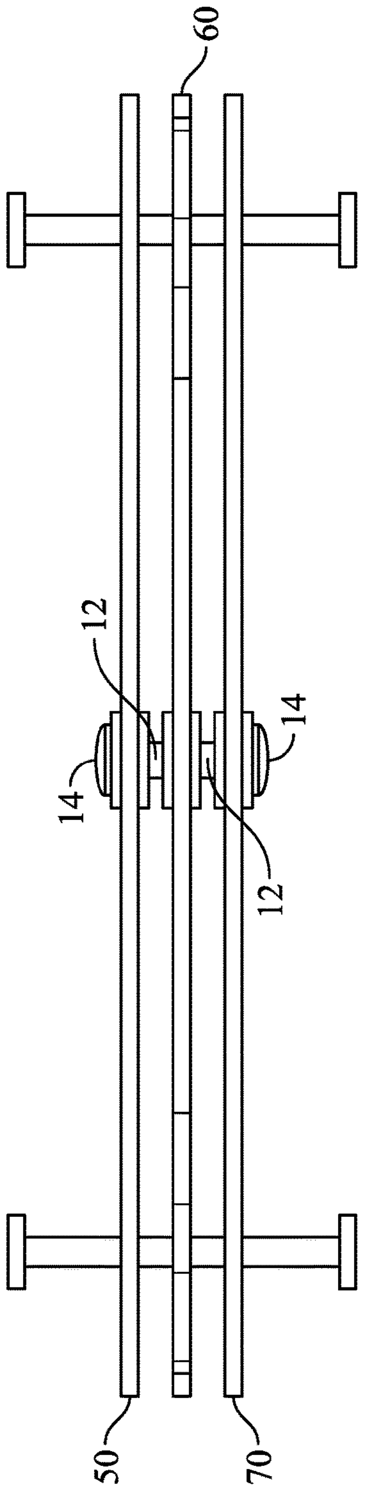
FIG. 14 is a side view of the embodiment of FIG. 10.

That is, referring more specifically to FIGS. 10-12, the first or top-most board 50 is transparent and contains colorful numbers or dots bearing numbers shown proceeding inwardly toward the center of the board 50, which is circular in shape in this embodiment, from a blue line or lines around the outer perimeter 23 of the board 50, as shown in FIG. 11. This first board 50 is positioned or mounted on a connector 14 that is itself rotatable or allows for rotation of the board 50 independently of the connector 14 rotation. The connector in the embodiment shown in the Figures is a snap rivet. The connector 14 also connects a bottom or second board 60 which contains colorful numbers or numbers on colorful dots positioned around the outer circumference 29 of the board, as shown in FIG. 12. The top board 50 contains the answers. When the top board 50 is turned, any number above the blue line along the perimeter 23 can be lined up with any number on the outer circumference 29 of the second board 60 for an answer following the sign of addition, subtraction, division, or multiplication, and the color of the bottom board. For example, if number "1+" on the top board 50 is lined up with number "4" in the same color (e.g., red) of the number on the second board 60 lined up with that number "1+", then the answer would be the number on the same section of the number "1+" on the top board 50 and the same color of the number on the second board 60 which was lined up with the "1+". The answer would be number "5" on the top board 50, which is "5" in red, the same color of the number on the second board 60. For another example, if one wanted to find the sum of two plus two, one would rotate top board 50 to line up the part of the outer perimeter 23 on board 50 that has the number "2+" with the part of the second board 60 which has "2" (in pink color) and then look for the answer on the top board 50 based on the color of the number "2" on the board 60. Since the color of "2" on board 60 was pink, one would look for a number on the top board 50 in the said section "2+" that had the same color—the color pink in this example. That number in pink is 4 indicating the answer or sum of "2 plus 2." This number "4" in pink is the only one in the section "2+" that is pink. In this manner, to calculate using the toy, one needs only to follow the sign of addition, subtraction, division, multiplication, and the colors which are shown/described on the boards.

Another way to find the sum of two plus two using the embodiment of the invention shown in FIGS. 11-12 is by counting numerical, colored spots of the section that has "2+" on the outer perimeter 23 of top board 50. The user counts from the center of the board 50 toward the edge (outward), and including zero (in yellow) as a number. That is, the user rotates board 50 to line up the "2+" on the outer perimeter 23 of top board 50 with the number 2 (in pink) on the second board 60. Next the user counts three spots from the center, because the user needs to include zero as the first number and then two more spots based on the number 2 (in pink) on the second board 60. The answer then is 4(in pink), which is the third spot on board 50 in the "2+" section of that board 50.

Figure 15:
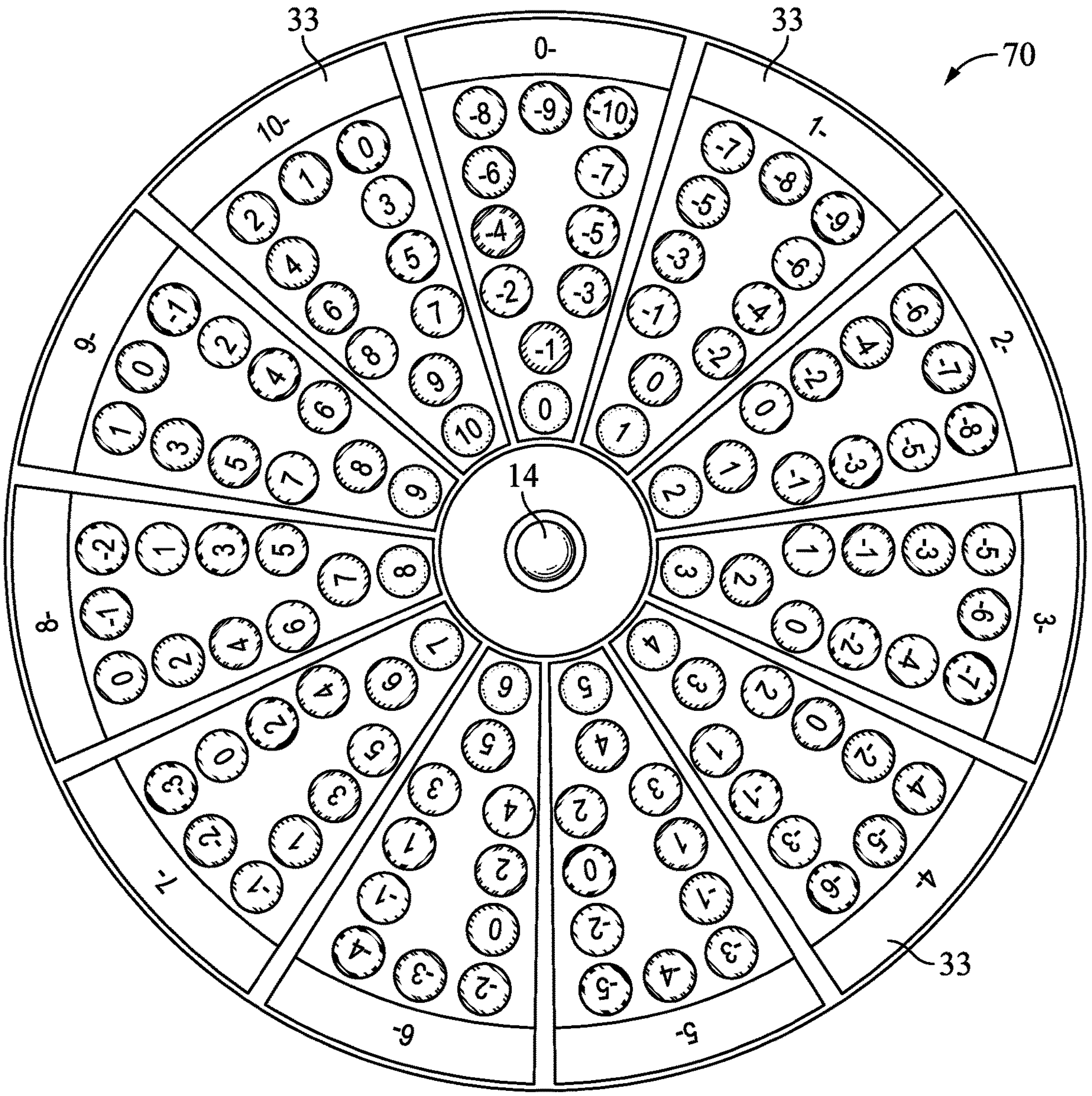
FIG. 15 is a bottom view of the embodiment of FIG. 10, showing the third or bottom layer, which becomes a second, alternative, "top" layer for the embodiment of FIG. 10 when the embodiment is turned upside down.

For subtraction, using board 70 in FIG. 15 with boards 60 in FIG. 12 or board 65 in FIG. 18, board 70, the top board, will have the answers. Thus, for example, to subtract the number ten from the number ten, the user would rotate top board 70 to line up the section "10-" in the outer perimeter 33 of board 70 with the number "10" in hot pink color on the underlying or second board 12 or 65. One would then look for the answer on the top board 70 based on the color of the number "10" on the second board 12 or 65. Since that color is hot pink, the answer would be zero, as zero is the number in section "10-" on board 70 that is that same color, hot pink.

Another way to find the answer to ten minus ten is by counting numerical, colored spots (circles on board 70) in the section "10-" on the outer perimeter 33 of board 70. The user begins by counting from the center of board 70 toward the outer perimeter 33. Zero is counted as a number. The user rotates top board 70 and lines up the "10-" section in the outer perimeter 33 with the number "10" on the second or underlying board 12 or 65. Beginning at the center of board 70, one counts the spots until one reaches a number with the same color as the number "10" on the second board 12. That number is "zero."

Figure 16:
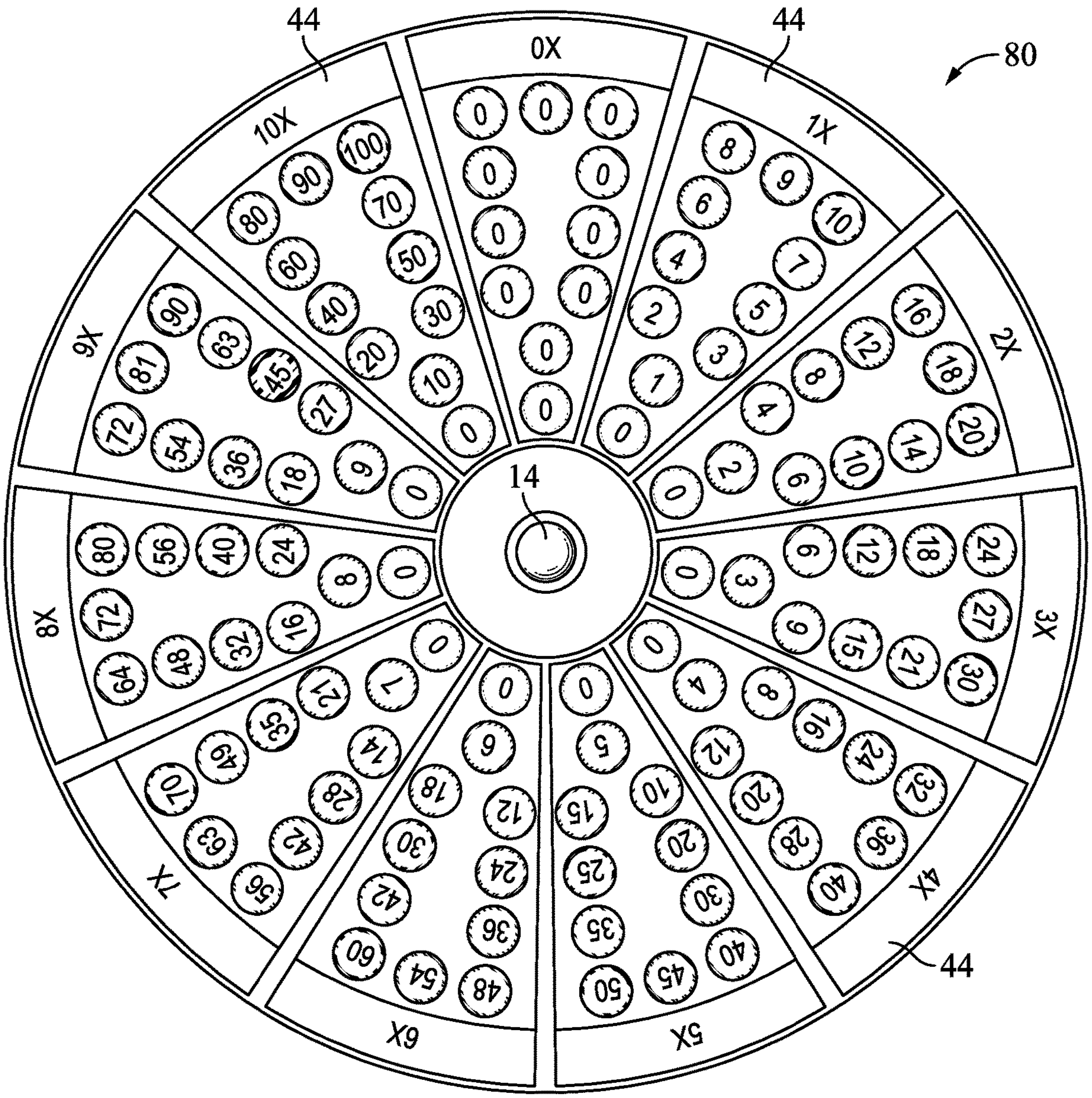
FIG. 16 is a third, alternative, top layer for the embodiment of FIG. 10, marked with numbers for multiplication calculations.

For multiplication, using board 80 in FIG. 16 with board 65 in FIG. 18, board 80, the top board, will have the answers. Thus, for example, to multiply the number three times the number three, the user would rotate top board 80 to line up the section "3x" in the outer perimeter 44 of board 80 with the number "3" in lime green color on the underlying or second board 65. One would then look for the answer on the top board 80 based on the color of the number "3" on the second board 65. Since that color is lime green, the answer would be nine as nine is the number in section "3x" on board 80 that is in that same color, lime green.

Another way to find the answer to three times three is by counting numerical, colored spots (circles on board 80) in the section "3x" on the outer perimeter 44 of board 80. The user begins by counting from the center of board 80 toward the outer perimeter 44. Zero is the first spot and is counted as a number. The user rotates top board 80 and lines up the "3x" section in the outer perimeter 44 with the number "3" on the second or underlying board 65. Beginning at the center of board 80, one counts the spots, with zero as the first spot, and then three more spots, until one reaches a number with the same color as the number "3" on the second board 65. That number is "nine," the fourth spot.

For division, using board 90 in FIG. 17 with board 65 in FIG. 18, board 90, the top board, will have the answers. Thus, for example, to divide the number nine by the number nine, the user would rotate top board 90 to line up the section "9/" in the outer perimeter 55 of board 90 with the number "9" in green color on the underlying or second board 65. One would then look for the answer on the top board 90 based on the color of the number "9" on the second board 65. Since that color is green, the answer would be one as one is the number in section "9/" on board 90 that is in that same color, green.

Another way to find the answer to nine divided by nine is by counting numerical, colored spots (circles on board 90) in the section "9/" on the outer perimeter 55 of board 80. The user begins by counting from the center of board 90 toward the outer perimeter 55. Zero is the first spot and is counted as a number. The user rotates top board 90 and lines up the "9/" section in the outer perimeter 55 with the number "9" on the second or underlying board 65. Beginning at the center of board 90, one counts the spots, with zero as the first spot, and then nine more spots, until one reaches a number with the same color (green) as the number "9" on the second board 65. That number is "one," the tenth spot.

Referring to FIGS. 19-22, embodiments of the invention are illustrated where the information layers or boards 10A form a ball or spherical shape rather than a flat, planar shape. Although in FIGS. 19-22, the outer cover 20 is shown to be transparent (and is typically comprised of plastic) and to completely envelope or surround board or ball 10A, in some other embodiments, outer cover 20 could be opaque with a window such as for example window 15 in FIG. 21 for viewing board or ball10A or could be transparent but only partially cover board or ball 10A. Board or ball 10A is preferably opaque (and is typically comprised of plastic for lightness of weight but could also be comprised of another synthetic material or of wood, metal. A connector 14 such as a snap rivet holds cover 20 to board 10A and allows cover 20 to rotate about board or ball 10A. Preferably board or ball10A is also rotatable, and is independently rotatable within cover 20.

In play, the embodiment of the invention of FIGS. 19-20 is shown for a math game, for example, for two persons or teams. One person or team selects a color and spot 38 for chasing (different from the other person or team's color and spot for chasing, such as for example spot 39) on cover 20. The teams begin with 10 points. After the rotation, the chasing team looks to see where its chasing spot lines up with the underlying board or ball 10A. In FIG. 19, the person or team chasing spot 38 would have "9" as its spot 38 is in the section of board or ball 10A showing a minus one, (and that person or teach thus subtracts one from its beginning 10 points) and the person or team chasing spot 39 would have "14" as its spot 39 is in the section of board or ball 10A showing a plus 4 (and that person or team thus adds four to its beginning 10 points). In some embodiments, board or ball 10A may have multiple numbers in a section of its surface so that multiple calculations are conducted by each person or team for each rotation. The rotations are continued with the persons or teams alternating as to which one makes the rotation, until one person or team reaches a total of 100 points and is the winner. As many persons or teams may play as there are different colored chasing spots on the cover 20.

Figure 21:
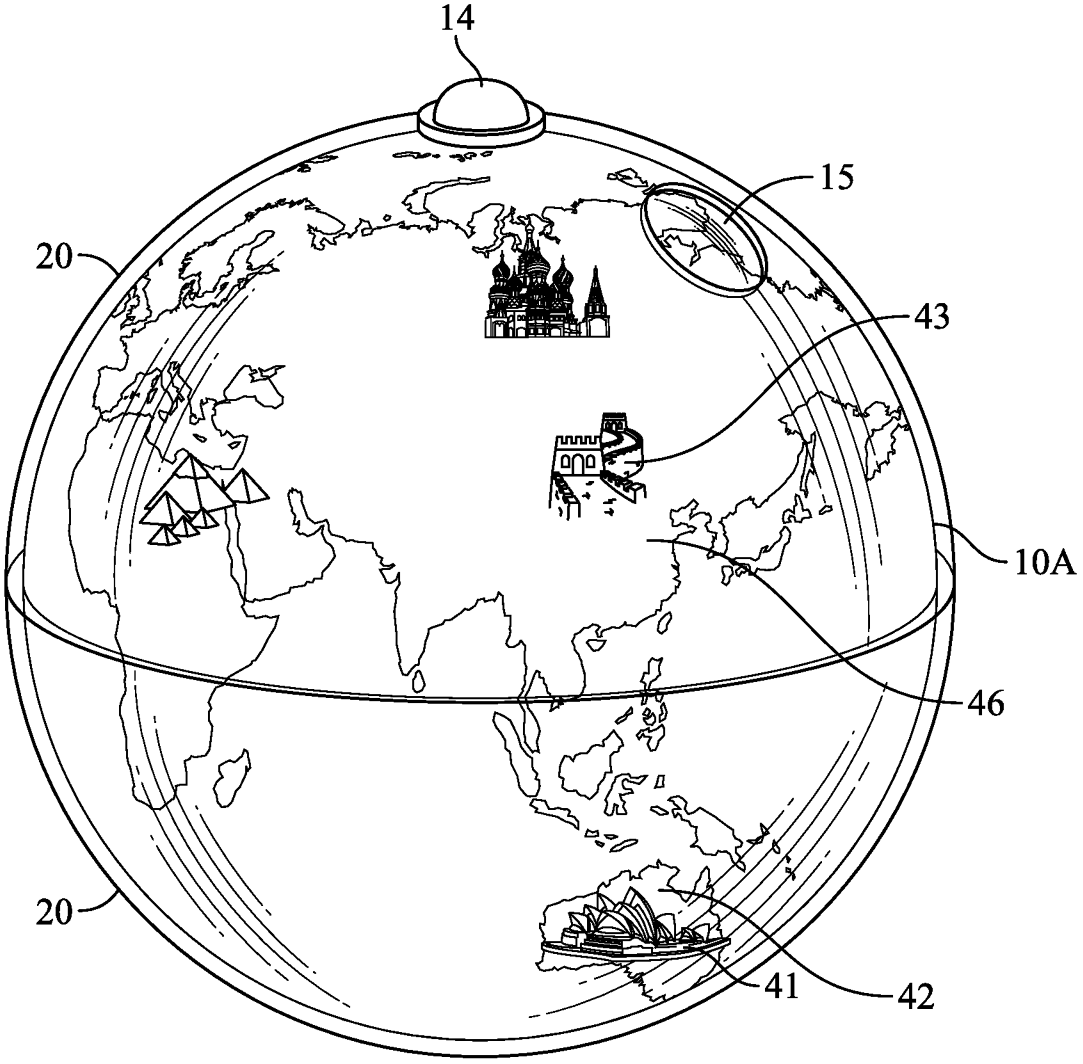
FIG. 21 is a side perspective of a fifth alternative embodiment of the invention in the form of a ball with at least an outer covering about the ball, such that the ball may be rotated within the covering, or the covering may be rotated about the ball, or both, illustrated with pictures of places for a matching game.
Figure 22:
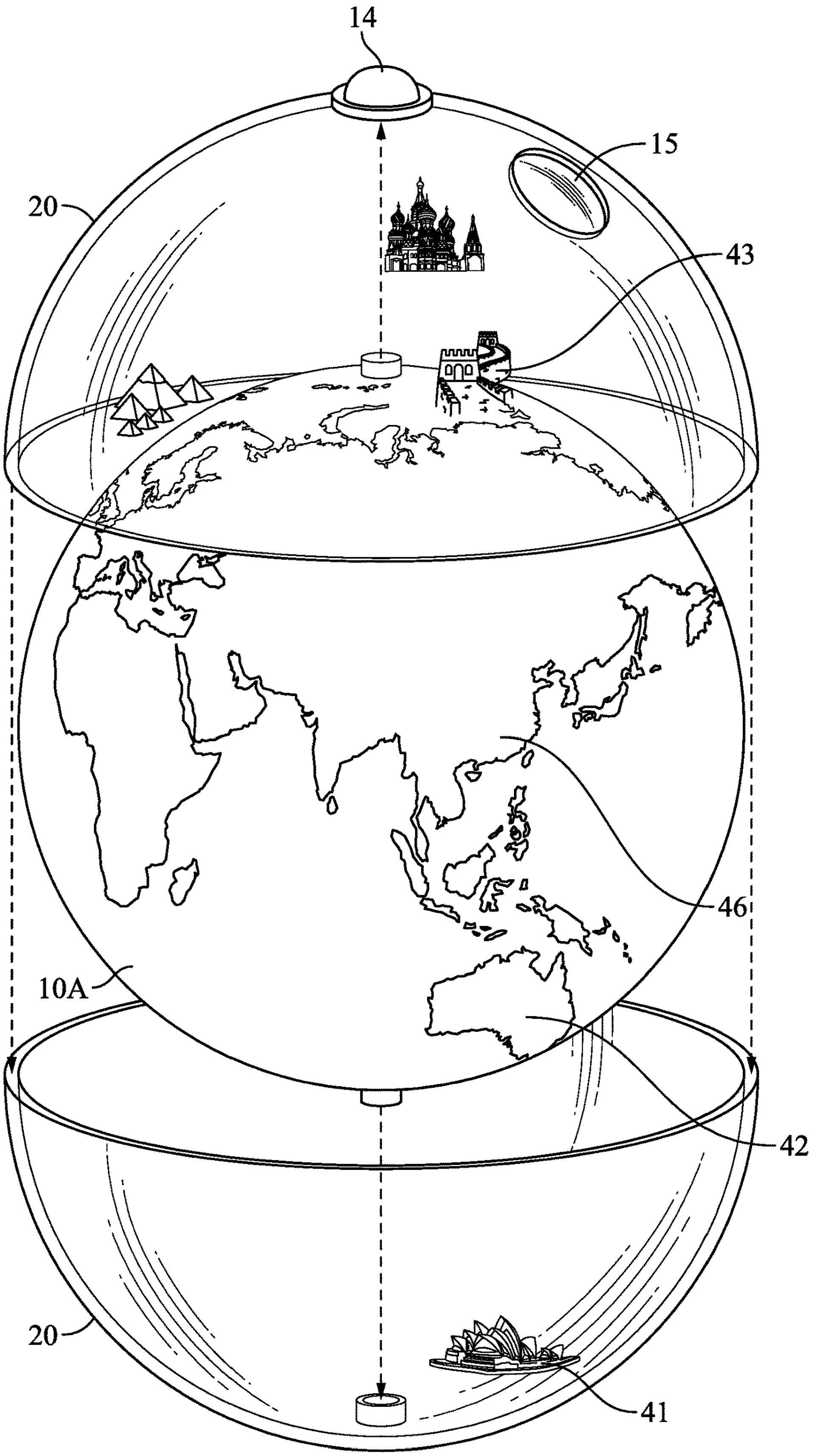
FIG. 22 is a blown apart view of the embodiment of FIG. 21.

In play, the embodiment of the invention shown in FIGS. 21 and 22 is designed for a geography matching game. Similar matching games could be constructed alternatively for a wide range of related figures, as discussed above with respect to FIGS. 1-5. In the geography matching game of FIGS. 21 and 22, cover 20 has depictions of famous landmarks and board or ball 10A is a world globe. In the game, players rotate cover 20 about ball 10A or ball 10A within cover 20 to position a particular landmark over the country where the landmark is found. For example, the Sydney Opera House 41 is positioned above Australia 42 and the Great Wall of China 43 is positioned above China 46 in FIG. 21.

Thus, there has been provided, in accordance with the present invention, a child's activity toy, which fully satisfies the goals, objects, and advantages set forth herein. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the claims.

Also, unless otherwise specifically noted, all of the features described herein may be combined with any of the above aspects, in any combination.

What is claimed is:

1. A toy comprising a top layer and a second layer underlying the top layer, each layer independently rotatable about a central axis holding the two layers apart in adjacent parallel planes and having information thereon, wherein the information on the second layer is visible without removal of the top layer and is related to the information on the top layer;

wherein the information on the top layer and the information on the second layer is comprised of numbers and the numbers are in a pattern and relationship such that calculations can be made using the numbers, such that the toy can be used for practicing mental math or for a counting game; and wherein the calculations are at least one of addition, subtraction, multiplication, division;

wherein for each addition calculation, the information on the top layer comprises the a first addend and the sum, and the information on the second layer comprises a second addend;

wherein for each subtraction calculation, the information on the top layer comprises a minuend and the difference, and the information on the second layer comprises a subtrahend;

wherein for each multiplication calculation, the information on the top layer comprises a first factor and the product, and the information on the second layer comprises a second factor; and wherein for each division calculation, the information on the top layer comprises a dividend and the quotient, and the information on the second layer comprises a divisor.

2. The toy of claim 1 sized to be held by hand.

3. The toy of claim 1 wherein the layers are flat and at least in part either circular, oval, oblong, triangular, rectangular, square, pentagonal, or hexagonal in shape.

4. The toy of claim 1 wherein at least one of the layers is removable and replaceable so as to enable variation in the information on the layers for game variety.

5. The toy of claim 1 wherein the toy is reversible such that the bottom layer can become the top layer in use without rearranging the layers.

6. The toy of claim 5 further comprising a third layer and a fourth layer underlying the second layer and independently rotatable about the central axis and having information thereon which is viewed by turning the toy upside down, wherein the information on the third layer is visible without removal of the fourth layer and is related to the information on the third layer, and wherein the information on the third layer and the information on the fourth layer are comprised of numbers and the numbers are in a pattern and relationship such that calculations can be made using the numbers, as with the first and second layer.

7. The toy of claim 1 wherein the pattern and relationship of the numbers is indicated by color and for each calculation, each number indicating a sum, difference, product, or quotient on the top layer has the same color as a corresponding second addend, subtrahend, second factor, or divisor, on the underlying layer.

8. The toy of claim 1 wherein multiple players can use the same toy for a competitive math game.

9. A toy comprising a first layer, a second layer underlying the first layer, and a third layer underlying the second layer held about a central axis holding the three layers apart in adjacent parallel planes, and at least the first layer and the third layer being independently rotatable about the axis, and each of the first layer, the second layer, and the third layer having information thereon;

wherein the information on the second layer is visible without removal of the first layer or the third layer and is related to the information on the first layer and the third layer, and information on the first layer is viewed by holding the toy so that the first layer is on top and information on the third layer is viewed by holding the toy upside down so that the third layer is on top;

wherein the information on the first layer, the second layer, and the third layer is comprised of numbers and the numbers are in a pattern and relationship such that calculations can be made using the numbers, such that the toy can be used for practicing mental math or for a counting game; and wherein the calculations are at least one of addition, subtraction, multiplication, division;

wherein for each addition calculation, the information on the first or third layer comprises a first addend and the sum, and the information on the second layer comprises a second addend;

wherein for each subtraction calculation, the information on the first or third layer comprises a minuend and the difference, and the information on the second layer comprises a subtrahend;

wherein for each multiplication calculation, the information on the first or third layer comprises a first factor and the product, and the information on the second layer comprises a second factor; and wherein for each division calculation, the information on the first or third layer comprises a dividend and the quotient, and the information on the second layer comprises a divisor.

10. The toy of claim 9 wherein the second layer comprises legs about its perimeter for supporting the toy on a level surface.

11. A toy comprising two layers comprising a top layer and a bottom layer held apart in adjacent parallel planes about a central axis, wherein either or both layers is independently rotatable, and wherein each layer contains information for a math game for one to four players, wherein the information on the top layer comprises four dividers dividing the top layer into four sections so that each player can be assigned at least one section, and an operand in each section, and the information on the bottom layer comprises numbers and mathematical operators indicating the operation a player is to perform by combining said numbers with said operand.

12. The toy of claim 11 wherein the operands comprise both addends and minuends.

* * * * *